United States Patent
Masel

Patent Number: 6,038,611
Date of Patent: Mar. 14, 2000

[54] METHOD FOR IMPLEMENTING A USER-TO-NETWORK (UNI) APPLICATION PROGRAMMING INTERFACE (API)

[75] Inventor: Jonathan Masel, Kfar Saba, Israel

[73] Assignee: Inverness Systems Ltd., Kfar Saba, Israel

[21] Appl. No.: 09/006,192

[22] Filed: Jan. 13, 1998

[51] Int. Cl.[7] ................................................. G06F 13/00
[52] U.S. Cl. .................... 709/302; 709/250; 709/300; 370/395; 370/469
[58] Field of Search ............................... 709/227, 228, 709/230, 250, 300, 301, 302, 303, 304; 370/395, 469, 903

[56] References Cited

U.S. PATENT DOCUMENTS

| | | | |
|---|---|---|---|
| 5,548,726 | 8/1996 | Pettus ....................................... | 709/227 |
| 5,548,779 | 8/1996 | Andert et al. ............................ | 709/203 |
| 5,751,972 | 5/1998 | Quinn et al. ............................. | 709/223 |
| 5,764,915 | 6/1998 | Heimsoth et al. ....................... | 709/227 |
| 5,764,920 | 6/1998 | Cook et al. .............................. | 709/238 |

Primary Examiner—Viet D. Vu
Attorney, Agent, or Firm—McDermott, Will & Emery

[57] ABSTRACT

An application programming interface (API) between user applications or other control applications and User to Network Interface (UNI) signaling software. The API provides an intelligent and flexible programming interface which enables higher layer software such as user application software to set up and tear down ATM connections more efficiently. The API provides an efficient method of activating the standard signaling procedures such as UNI signaling as compared to the prior art method. Shared sets of parameters defining the setting up and the tearing down of calls are predefined by the user or provided as defaults by the API itself. Instead of requiring a user application to specify every single call related parameter, only the set of predefined parameters needs to be identified which significantly increases the throughput of the underlying signaling stack. Since the predefined sets of parameters are already encoded, the time required to process the call parameters is greatly reduced. In addition, the API is constructed to preserve the flexibility of the user application software, while at the same time, a user application has the option of exploiting predefined shared sets of parameter values.

9 Claims, 4 Drawing Sheets

METHOD FOR IMPLEMENTING A USER-TO-NETWORK (UNI) APPLICATION PROGRAMMING INTERFACE (API)

FIELD OF THE INVENTION

The present invention relates generally to asynchronous transfer mode (ATM) and more particularly relates to an application programming interface (API) method for user to network interface (UNI) signaling in ATM networks.

BACKGROUND OF THE INVENTION

ATM originated as a telecommunication concept defined by the Comite Consulatif International Telegraphique et Telephonique (CCITT), now known as the International Telecommunications Union (ITU), and the American National Standards Institute (ANSI) for carrying user traffic on any User to Network Interface (UNI/Q.2931) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multiprotocol transmissions. Since ATM is protocol transparent, the various protocols can be transported at the same time. With ATM, phone, fax, video, data and other information can be transported simultaneously.

The components of the ATM header consist of the following fields. A generic flow control (GFC) field provides flow control; a virtual path identifier (VPI)/virtual channel identifier (VCI) field allows the network to associate a given cell with a given connection; a payload type identifier (PTI) field indicates whether the cell contains user information or management related data and is also used to indicate a network congestion state or for resource management (i.e., the EFCI bit which is part of the PTI field); a cell loss priority (CLP) field indicates that cells with this bit set should be discarded before cells with the CLP bit clear; a header error check (HEC) field is used by the physical layer for detection and correction of bit errors in the cell header and is used for cell delineation.

The provisioning of an ATM network connection may include the specification of a particular class of service. The following list the various classes of service currently defined in ATM. Constant bit rate (CBR) defines a constant cell rate and is used for emulating circuit switching (e.g., telephone, video conferencing, television, etc.). Variable bit rate (VBR) allows cells to be sent at a variable bit rate. Real-time VBR can be used for interactive compressed video and non real-time can be used for multimedia e-mail.

Available bit rate (ABR) is designed for data traffic (e.g., file transfer traffic, etc.) and is the class service connected with resource management. The source is required to control its rate depending on the congestion state of the network. The users are allowed to declare a minimum cell rate, which is guaranteed to the virtual circuit by the network. ABR traffic responds to congestion feedback from the network.

A fourth class of service, unspecified bit rate (UBR), is utilized by data applications that are not sensitive to cell loss or delay and want to use leftover capacity. During congestion, the cells are lost but the sources are not expected to reduce their cell rate.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The signaling utilized in ATM networks is defined by a set of three protocols: UNI signaling (ITU standard Q.2931), Service Specific Coordination Function (SSCF/Q.SAAL1/Q.2130) and Service Specific Connection Oriented Protocol (SSCOP/Q.SAAL2/Q.2110). The signaling layer performs the setting up and tearing down of ATM connections that run end to end through the ATM network. The other layers, which are collectively known as the Signaling ATM Adaptation Layer (SAAL), are responsible for providing the signaling layer with a reliable service over which messages generated therein may be transported.

The signaling module provides a means for defining a large number of parameters that specify the destination address, protocol selections and quality of service of the call that the user wishes to set up. In operation, the signaling module performs a function roughly analogous to the process of dialing in the context of the normal telephone network, i.e., it establishes the connection through the network to the end user before the data transfer phase begins or before speech begins, in the case of the telephone network analogy.

Unlike the normal telephone system, however, ATM networks are required to set up and tear down a large number of calls per second. For example, it is not uncommon for a single processor to be required to handle 300 to 500 calls per second. The speed with which these calls are set up and torn down is crucial for the users of an ATM network and hence for the manufacturers of ATM switches and other related network equipment.

Currently, it is customary for vendors of ATM equipment to purchase implementations of the UNI signaling protocols, since their basic functionality is standard and their implementation is quite complex. The UNI signaling protocol software implementations provide users, i.e., the ATM equipment manufacturers, with an API to all the primitives (standard functions) contained in the signaling software. The API function calls included in the software define how the signaling functions are evoked, in addition to defining the complete functional capabilities of the UNI signaling protocol software.

The majority of signaling implementations provide an API sufficiently flexible that provides the user with control over all parameters that are associated with the new call that needs to be set up. This is attractive since it provides the user with maximum flexibility, providing the user with run time control of all related parameters. However, a disadvantage of this approach is that there are a large number of parameters that can be associated with any particular call and encoding them all during run time is a time consuming process. This limits the number of calls per second that these signaling software packages can handle which often is in the range of only 30 to 50 calls per second.

The problem described above can be illustrated using a real world example. One of the most common ATM applications is LAN Emulation (LANE). The LANE is a module of code that resides conceptually above the UNI signaling module, i.e., the LANE is a user of the signaling stack. The LANE standards (version 1.0) currently in effect do not offer a way of specifying quality of service when establishing new connections. Therefore, LANE implementations provide identical values for the vast majority of parameters associated with each ATM connection that it sets up. This, however, creates a situation whereby the signaling software spends a considerable amount of time encoding identical parameters for each call that it sets up. This is both wasteful and costly to the users of the signaling software.

Another example is the way in which incoming calls are handled in either switches or end user devices. In the typical case, an incoming SETUP message is decoded and all of the Information Elements (IEs) are examined with most being used without change. For example, a switch would handle an incoming call request by examining the requested IEs in the SETUP message received, modifying (or adding) one or two IEs but would leave the remainder of the IEs unchanged. Here again the situation is that most of the incoming IEs are decoded, processed and then encoded with exactly the same values.

SUMMARY OF THE INVENTION

The present invention provides an interface between user applications or other control applications and User to Network Interface (UNI) signaling software. The purpose of the application programming interface (API) is to provide an intelligent and flexible programming interface which enables higher layer software such as user application software to set up and tear down ATM connections more efficiently.

The API of the present invention provides an efficient method of activating the standard signaling procedures such as UNI signaling as compared to the prior art method. Shared sets of parameters defining the setting up and the tearing down of calls are predefined by the user or provided as defaults by the API itself. Instead of requiring a user application to specify every single call related parameter, only the set of predefined parameters needs to be identified. Since the predefined sets of parameters are already encoded, the time required to process the call parameters is greatly reduced.

In addition, the API is constructed to preserve the flexibility of the user application software, while at the same time, a user application has the option of exploiting predefined shared sets of parameter values. This results in a far more intelligent and useful API that dramatically increases the throughput of the underlying signaling stack, e.g., the UNI signaling stack.

There is provided in accordance with the present invention a user to network (UNI) application programming interface (API) capable of preceding information elements to be utilized by a conventional signaling stack, the method comprising the steps of allocating a frame structure, the frame structure adapted to store a plurality of information elements, encoding one or more individual information elements into the frame structure and storing the frame structure, after all required information elements have been encoded, as a standard call profile in a table adapted to store a plurality of the standard call profiles.

The method comprises the steps of retrieving one of the standard call profiles from the table when a call is requested by a user application, copying the retrieved standard call profile from the table into a frame structure allocated by the user application and returning the standard call profile previously retrieved to the table for possible use by other calls.

The method comprises the step of adding an additional individual information element to a standard call profile by encoding the additional individual information element into the frame structure associated with the standard call profile. In addition, the method comprises the step of deleting an individual information element from a standard call profile by removing the individual information element from the frame structure associated with the standard call profile. Also, the method comprises the step of modifying an individual information element within a standard call profile by modifying the individual information element within the frame structure associated with the standard call profile.

Further, the method comprises the step of providing a user of the signaling stack the capability of setting up a new call by selecting the appropriate standard call profile from the table containing a plurality of standard call profiles.

There is also provided in accordance with the present invention a method of setting up a call utilizing a conventional signaling stack, the method comprising the steps of providing a user to network (UNI) application programming interface (API) capable of preceding information elements to be utilized by a conventional signaling stack by: allocating a frame structure, the frame structure adapted to store a plurality of information elements, encoding one or more individual information elements into the frame structure and storing the frame structure, after all required information elements have been encoded, as a standard call profile in a table adapted to store a plurality of the standard call profiles, retrieving one of the standard call profiles stored within the table in response to the call setup request and forwarding the frame structure associated with the retrieved standard call profile to the signaling stack with an indication that the frame structure is to be used for a call setup request primitive.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AAL | ATM Adaptation Layer |
| ABR | Available Bit Rate |
| ANSI | American National Standards Institute |
| API | Application Programming Interface |
| ATM | Asynchronous Transfer Mode |
| CBR | Constant Bit Rate |
| CCITT | Comite Consulatif International Telegraphique et Telephonique |
| CLP | Cell Loss Priority |
| CPCS | Common Part Convergence Sublayer |
| EFCI | Explicit Forward Congestion Indicator |
| FDDI | Fiber Distributed Data Interface |
| GFC | Generic Flow Control |
| HEC | Header Error Check |
| IE | Information Element |
| ITU | International Telecommunications Union |
| LAN | Local Area Network |
| LANE | LAN Emulation |
| PTI | Payload Type Identifier |
| SAAL | Signaling ATM Adaptation Layer |
| SSCF | Service Specific Coordination Function |
| SSCOP | Service Specific Connection Oriented Protocol |
| UBR | Unspecified Bit Rate |
| UNI | User to Network Interface |
| VBR | Variable Bit Rate |
| VCI | Virtual Circuit Identifier |
| VPI | Virtual Path Identifier |

General Description

The present invention comprises a method and associated application programming interface (API) that enables higher layer user application software to set up and tear down asynchronous transfer mode (ATM) connections quickly and efficiently. The API of the present invention implements the ATM user to network interface (UNI) signaling standard. Signaling is used to set up and tear down connections, i.e., calls, between two endpoints in an ATM network. All call setup procedures must be complete before a connection may be utilized to transfer data. The signaling and call set up procedures are analogous to dialing in the regular commonly used telephone network. In the case of the regular telephone network, an end user must first be dialed and they must pickup the phone before either side can begin speaking or transmitting data over the connection.

In ATM networks, the signaling protocol specifies not only whom it is desired to speak to, but also how to speak to them. The 'how' includes the characteristics the ATM network and the remote endpoint need to know about the call, whether to reserve bandwidth for the call, how to route the call, etc.

Figure 1:
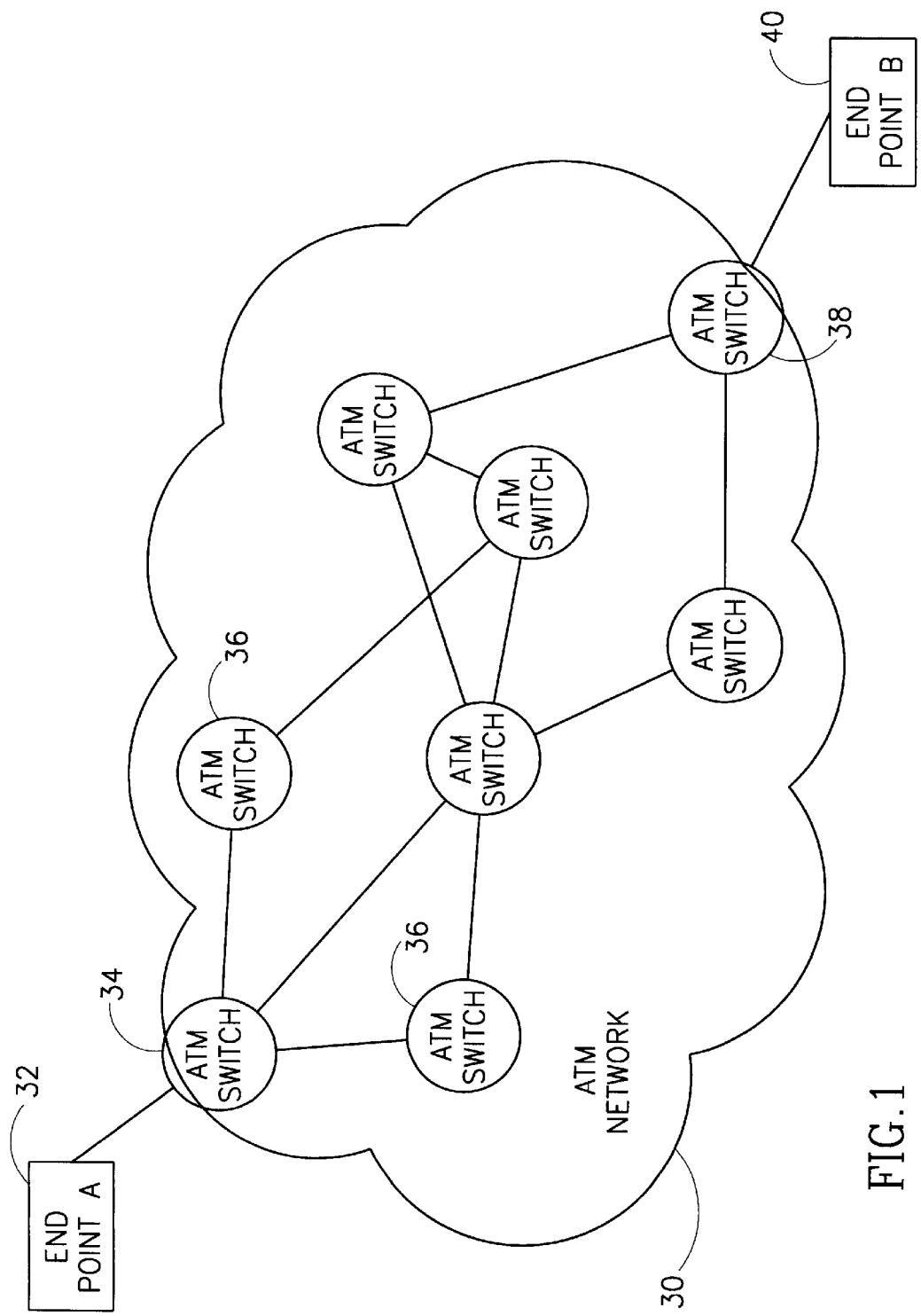
FIG. 1 is a high level block diagram illustrating an example of an ATM network having two end points, endpoint A and endpoint B.

A high level block diagram illustrating an example of an ATM network having two end points, endpoint A and endpoint B is shown in FIG. 1. The general configuration of the ATM network, generally referenced 30, shows a plurality if ATM switches 36, edge ATM switches 34, 38 and two endpoints, endpoint A 32 and endpoint B 40. For illustration purposes, it is assumed that a call is to be established between endpoint A and endpoint B.

Figure 2:
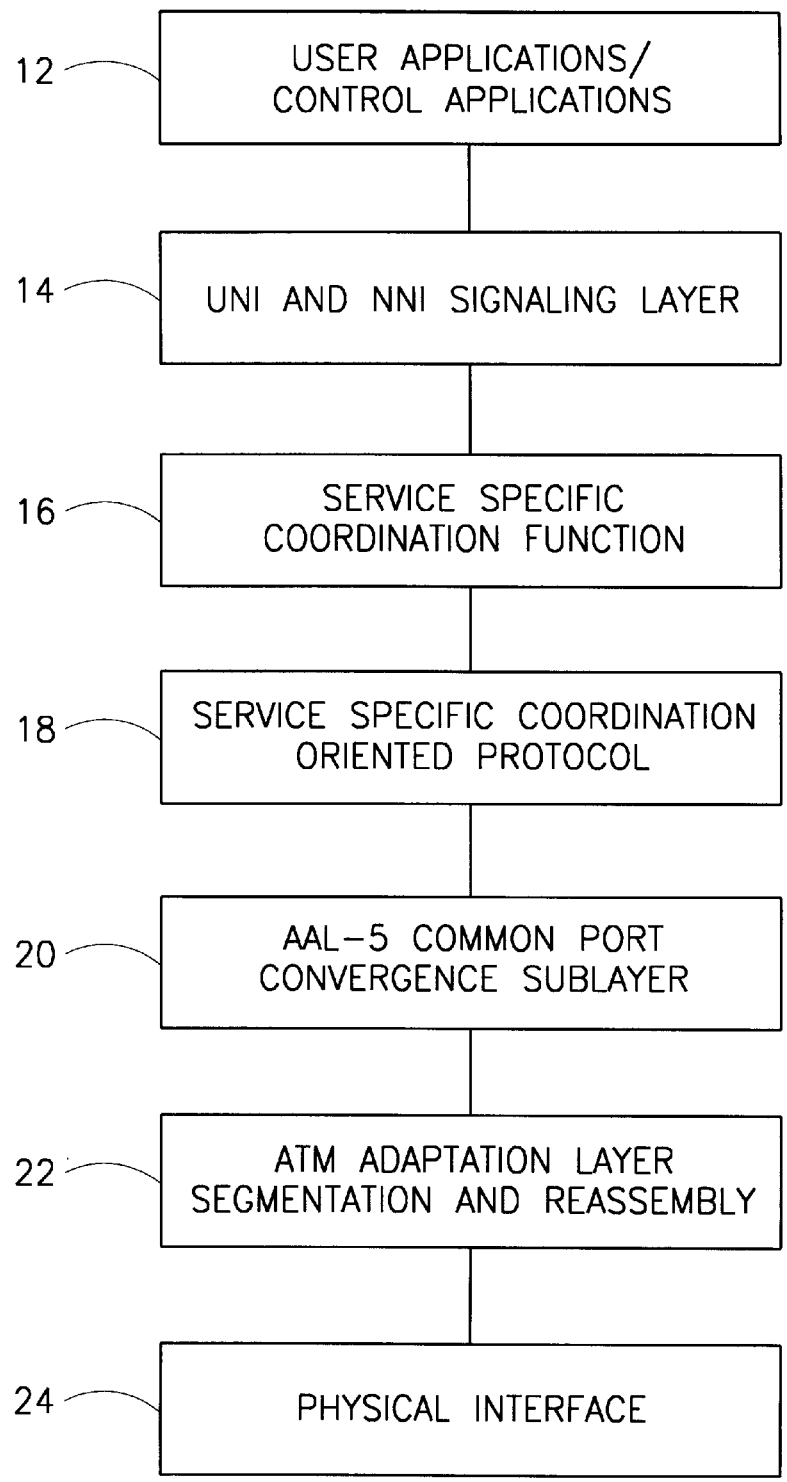
FIG. 2 is a high level block diagram illustrating a typical prior art ATM signaling software stack and the protocols contained therein.

A high level block diagram illustrating a typical prior art ATM signaling software stack and the protocols contained therein is shown in FIG. 2. At the top of the stack lies the user application or control application 12 that controls the flow of data to and from the layers below. The user application 12 interfaces with the UNI and NNI signaling layer 14 (ITU standard Q.2931). This layer, in turn, interfaces with the Service Specific Coordination Function (SSCF/Q.SAAL1/Q.2130) layer 16. This layer interfaces with the Service Specific Connection Oriented Protocol (SSCOP/Q.SAAL2/Q.2110) 18 directly below it. Following the SSCOP layer lies the ATM Adaptation Layer (AAL)-5 Common Part Convergence Sublayer (CPCS) 20. This layer interfaces with the ATM Adaptation Layer Segmentation and Reassembly layer 22. This layer is followed by the physical interface 24 which may comprise, for example, T1, ATM-25, OC-1, OC-3 or OC-12 data communication interfaces.

The signaling layer 14 performs the setting up and tearing down of ATM connections that run end to end through the ATM network. The other layers, i.e., layers 16, 18, 20, 22 are collectively known as the Signaling ATM Adaptation Layer (SAAL) and are responsible for providing the signaling layer with a reliable service over which messages generated therein may be transported.

The signaling layer provides a means for defining a large number of parameters that specify the destination address, protocol selections and quality of service of the call that the user wishes to set up. The LNI signaling protocol software implementations provide users, i.e., the ATM equipment manufacturers, with an API to all the primitives (standard functions) contained in the signaling software. The API function calls included in the software define how the signaling functions are evoked, in addition to defining the complete functional capabilities of the UNI signaling protocol software.

The majority of signaling implementations provide an API sufficiently flexible that provides the user with control over all parameters that are associated with the new call that needs to be set up. On the one hand, this is attractive since it provides the user with maximum flexibility, however, a disadvantage is that there are a large number of parameters that can be associated with any particular call and encoding them all during run time is a time consuming process.

Figure 3:
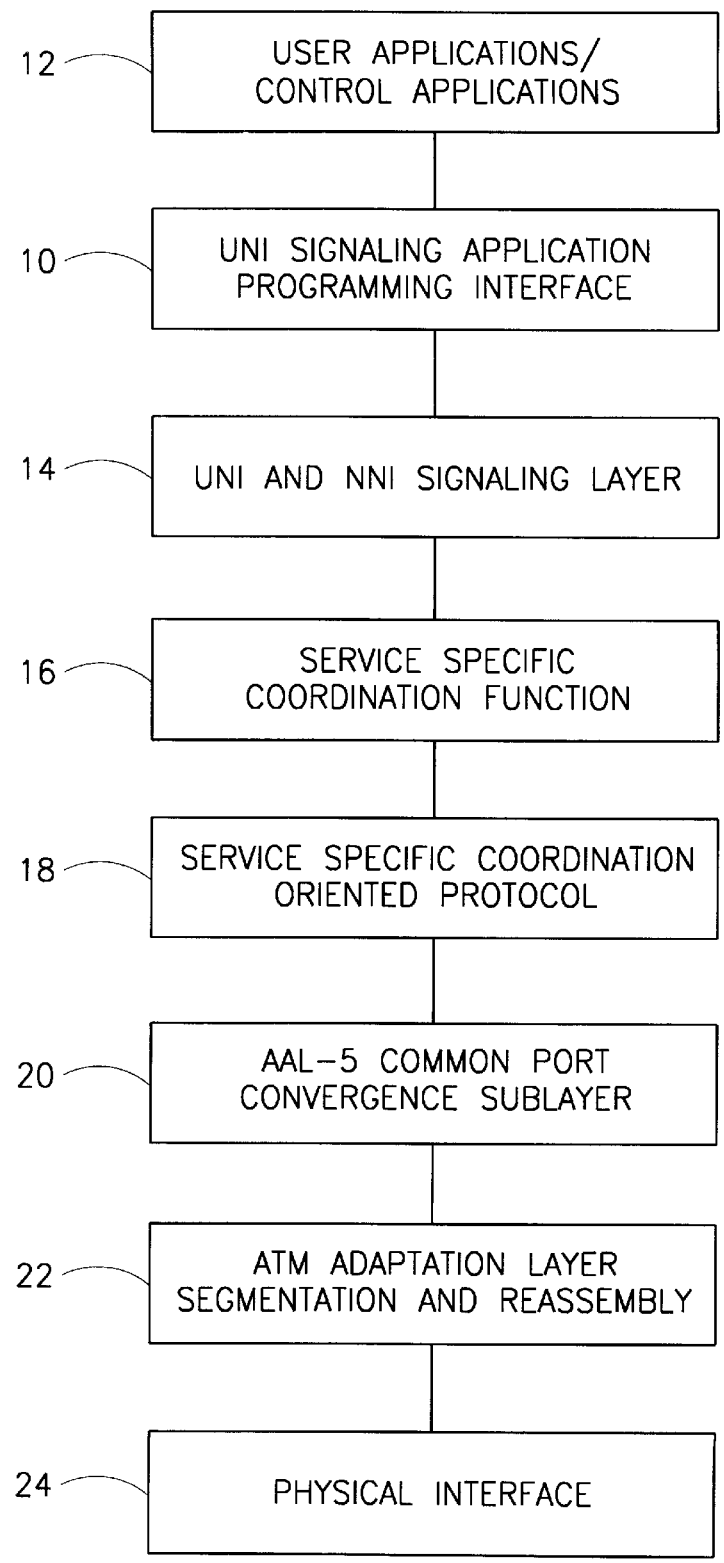
FIG. 3 is a high level block diagram illustrating the UNI signaling application programming interface (API) of the present invention within the framework of a typical ATM signaling software stack.

A high level block diagram illustrating the UNI signaling application programming interface (API) of the present invention within the framework of a typical ATM signaling software stack is shown in FIG. 3. The protocol stack layers of FIG. 3 are similar to those of FIG. 2, with the exception that an UNI signaling API layer, generally referenced 10, has been added to the stack.

Figure 4:
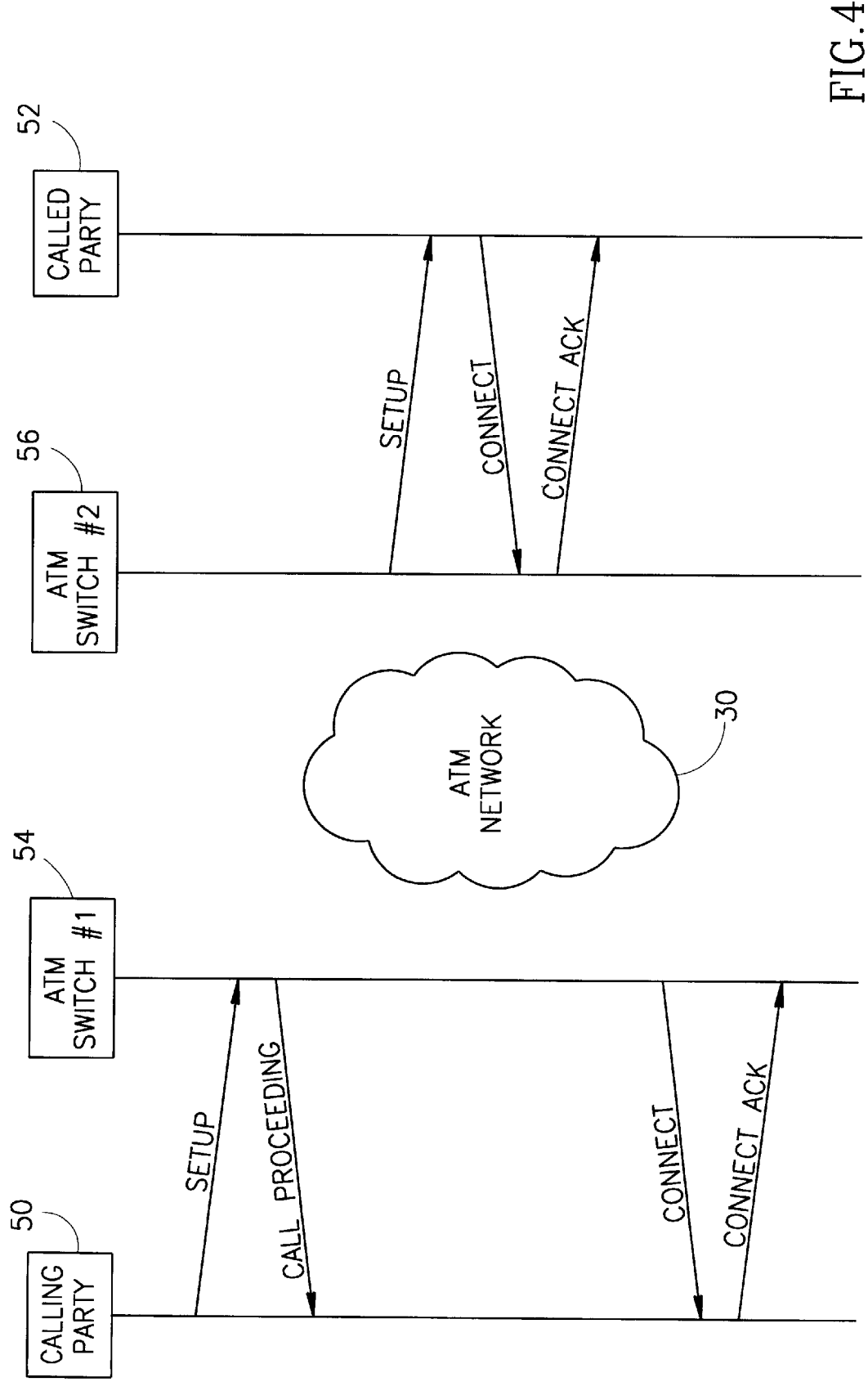
FIG. 4 is a diagram illustrating the interaction across two UNIs, one local and the other remote.

The UNI is the interface between a user device and a switch over which the signaling protocol is run. The signaling protocol itself is defined in terms of a series of standard protocol primitives, each of which causes a particular type of message (sometimes several messages) to be transmitted across the UNI interface. The main protocol primitives involved in setting up a call will now be described in more detail. A diagram illustrating the interaction across two UNIs, one local and the other remote is shown in FIG. 4. The local UNI is connected to the calling party 50 and the second remote is connected to the called party 52. Also shown in FIG. 4 are the two edge devices, ATM switch #1 54 connected to the calling party 50 and ATM switch #2 56 connected to the called party 52.

The signaling module provides means for defining a relatively large number of parameters that define the destination address, protocol selections and quality of service of the call that the user wishes to set up. Each of these parameters, known as an information element (IE), must be encoded on the transmitting side and decoded at the far end receiving side in accordance with the UNI signaling standards specifications. Each IE may have multiple sub fields, appear several times in the same message and have different rules regarding its use and validity.

In operation, ATM networks are required to set up and tear down a large number of calls per second. In fact, it not uncommon for a single processors to be required to handle over one thousand calls per second. The speed with which these calls are set up and torn down is crucial for the users of an ATM network and hence for the manufacturers of ATM switches and other equipment. One of the main bottlenecks in terms of performance of call handling is the way in which the IEs, i.e., per call parameters, are processed by the signaling software.

Precoding Information Elements

The principle of the present invention is to pre-code information elements into shared sets of parameters known as call profiles. The invention is based on the separation of the encoding of the per call parameters and the call setup request messages themselves. The user of the signaling stack prepares in advance any number of standard call profiles. Each profile is a full set of per call parameters which have already been fully encoded. The user can prepare as many call profiles in advance as she/he wishes. In addition, change individual parameters in any given profile can be changed when setting up a new call.

Therefore, whenever a new set of parameters is to be encoded for a new connection, the work to be performed is reduced to selecting the appropriate call profile and adapting it if necessary. The remaining functionality of the signaling stack, e.g., signaling state machine and SSCF and SSCOP procedures, remain unchanged.

The main part of the signaling API is a set of routines that encode individual information elements. A frame structure is allocated and each information element is encoded into the new frame structure. After all required information elements have been encoded, the frame is stored as one of the 'standard' profiles to be used at a later stage.

When this profile is needed by a user or control application, it is retrieved from its table and copied into a new frame structure that has been allocated by the application. The standard profile is then returned to the table for possible further use later on for other calls. The application code may then further process the information elements, changing individual parameters if required while leaving the other information elements intact.

Upon completion of this process, the application code forwards the frame to the signaling package indicating that the frame is to be used for a call set up request primitive. The signaling software takes the frame, prepends the various standard headers to the information elements and then passes the whole frame to the SAAL modules (SSCF and SSCOP).

Reusing Incoming Information Elements

The routines for building individual information elements are also utilized to reuse information elements in incoming messages. Each incoming message is fully decoded, since the validity of the message must be checked, but in most cases only a small number of the received information elements are actually changed. The content of nearly all of the received information elements is processed unchanged. This is the case regardless of whether the receiving application is an ATM switch or an ATM endpoint. Only a small number of information elements are either added or modified by the software in the layers above the signaling layer.

The call control software and the UNI signaling software recognize and exploit this fact. Each frame received is passed up to the call control software and special IE-level routines are used by the call control software that function to apply the minimum changes to the frame necessary while reusing the contents of the received information elements as much as possible. Thus, since far less information element encoding is required, significant reductions in complexity are achieved with accompanying gains in performance.

The Signaling APIs

The following function prototypes define the interface routines in the API that perform the call profile functionality described above.

Call Setup Request

All signaling layer messages are generated by calls to routines such as presented hereinbelow. The following routine GRO_Setup_req is called to request the setup of a new call. Note that the 'p_MU' parameter contains a frame of all the pre-encoded information elements that have been prepared beforehand as previously described above.

e_Err GRO_Setup_req(t_Handle Id, void *p_MU, byte IsMultipoint, t_Handle *p_ObjId, byte *p_VPCI_VCI);

Information Element Handling Routines

The following routine e_Err IE_Cut functions to cut, i.e., remove, an individual information element from a frame.

e_Err IE_Cut(void *p_Frame, byte IE_id);

This routine is intended to be utilized in handling incoming, i.e., received, frames of information elements. As described previously, the incoming information elements are reused. However, one or more information elements may need to be removed from the frame. This is accomplished by using the e_Err IE_Cut routine above.

For example, assume a frame is received containing eight information elements. The e_Err IE_Cut routine above is called to delete any individual information element from the frame. Thus, the remainder of the frame can be reused in the call processing. The data items that must be specified to the e_Err IE_Cut routine are the frame containing the information elements and the code that identifies the specific information element that is to be deleted from the frame.

The following 'Build_IE' routines function to encode individual information elements and append them to a frame. These routines are used during initialization procedures, when the various templates of precoded information elements are created. The 'Build_IE' routines are intended to be utilized in handling incoming, i.e., received frames, of information elements. As it is intended to reuse the incoming information elements, one or more information elements may need to be added to the frame. This is accomplished by using the 'Build_IE' routines below.

The precoded information elements within the frame are utilized later on to set up individual calls. Each of the following routines is adapted to handle a single type of information element. Each routine is adapted to receive a pointer to the frame object that is being assembled. In addition, the values of the internal fields of the particular information element to be constructed are also passed to the routine.

```
void Build_IE_Cause(void *p_Frame, ...);
void Build_IE_Call_State(void *p_Frame, byte CallState);
void Build_IE_End_Point_Ref(void *p_Frame, byte Org, int EpRef);
void Build_IE_End_Point_State(void *p_Frame, byte State);
void Build_IE_Aal_Param(void *p_Frame, byte AALtype, ...);
void Build_IE_Atm_Traffic_Descr(void *p_Frame, ...);
void Build_IE_Conn_Identifier(void *p_Frame, int VPCI, int VCI);
void Build_IE_Qos_Param(void *p_Frame, int QOSforw,
    int QOSback);
void Build_IE_High_Layer_Info(void *p_Frame, byte
    InfoType, int InfoLength, byte *p_Info);
void Build_IE_Bearer_Capability(void *p_Frame, byte Class, ...);
void Build_IE_Low_Layer_Info(void *p_Frame, ...);
void Build_IE_Sending_Complete(void *p_Frame);
void Build_IE_Repeat_Indicator(void *p_Frame);
void Build_IE_Calling_Numb(void *p_Frame, byte Type,
    byte AdrPlan, int Length, byte *p_Adr, ...);
void Build_IE_Calling_Subadr(void *p_Frame, byte Type, int Length,
    byte *p_Adr);
void Build_IE_Called_Numb(void *p_Frame, byte Type, byte
    AdrPlan, int Length, byte *p_Adr);
void Build_IE_Called_Subadr(void *p_Frame, byte Type, int Length,
    byte *p_Adr);
void Build_IE_Transit_Net_Sel(void *p_Frame, int InfoLength,
    byte *p_Info);
void Build_IE_Restart_Indicator(void *p_Frame, byte Class);
```

While the invention has been described with respect to a limited number of embodiments, it will be appreciated that many variations, modifications and other applications of the invention may be made. For example, one skilled in the communication programming art will appreciate that the routines presented above for building the frame from individual information elements can be written in numerous ways while still performing the same functions. In addition, other types of information elements can be appended to a frame without departing from the scope of the present invention.

What is claimed is:

1. A method for implementing a user-to-network (UNI) application programming interface (API) capable of preceding information elements to be utilized by a conventional signaling stack, said method comprising the steps of:

allocating a frame structure, said frame structure adapted to store a plurality of information elements;

encoding one or more individual information elements into said frame structure;

storing said frame structure, after all required information elements have been encoded, as a standard call profile in a table adapted to store a plurality of said standard call profiles;

retrieving one of said standard call profiles from said table when a call is requested by a user application;

copying the retrieved standard call profile from said table into a frame structure allocated by said user application; and returning the standard call profile previously retrieved to said table for possible use by other calls.

2. The method according to claim 1, further comprising the step of adding an additional individual information element to a standard call profile by encoding said additional individual information element into the frame structure associated with the standard call profile.

3. The method according to claim 1, further comprising the step of deleting an individual information element from a standard call profile by removing said individual information element from the frame structure associated with the standard call profile.

4. The method according to claim 1, further comprising the step of modifying an individual information element within a standard call profile by modifying said individual information element within the frame structure associated with the standard call profile.

5. The method according to claim 1, further comprising the step of providing a user of said signaling stack the capability of setting up a new call by selecting the appropriate standard call profile from said table containing a plurality of standard call profiles.

6. A method of setting up a call utilizing a conventional signaling stack, said method comprising the steps of:

providing a user-to-network (UNI) application programming interface (API) capable of preceding information elements to be utilized by a conventional signaling stack by:

allocating a frame structure, said frame structure adapted to store a plurality of information elements;

encoding one or more individual information elements into said frame structure;

storing said frame structure, after all required information elements have been encoded, as a standard call profile in a table adapted to store a plurality of said standard call profiles;

retrieving one of said standard call profiles from said table when a call is requested by a user application;

copying the retrieved standard call profile from said table into a frame structure allocated by said user application; and returning the standard call profile previously retrieved to said table for possible use by other calls;

retrieving one of said standard call profiles stored within said table in response to the call setup request; and forwarding the frame structure associated with the retrieved standard call profile to the signaling stack with an indication that said frame structure is to be used for a call setup request primitive.

7. The method according to claim 6, further comprising the step of adding an additional individual information element to a standard call profile by encoding said additional individual information element into the frame structure associated with the standard call profile.

8. The method according to claim 6, further comprising the step of deleting an individual information element from a standard call profile by removing said individual information element from the frame structure associated with the standard call profile.

9. The method according to claim 6, further comprising the step of modifying an individual information element within a standard call profile by modifying said individual information element within the frame structure associated with the standard call profile.

* * * * *